US012770526B2

(12) United States Patent
Roney et al.

(10) Patent No.: US 12,770,526 B2
(45) Date of Patent: Oct. 20, 2026

(54) INTEGRATED KITCHEN SYSTEM

(71) Applicant: One Enterprises, LLC, Provo, UT (US)

(72) Inventors: Blake Roney, Provo, UT (US); Tannon Roney, Provo, UT (US)

(73) Assignee: One Enterprises, LLC, Provo, UT (US)

( * ) Notice: Subject to any disclaimer, the term of this patent is extended or adjusted under 35 U.S.C. 154(b) by 181 days.

(21) Appl. No.: 18/736,367

(22) Filed: Jun. 6, 2024

(65) Prior Publication Data

US 2024/0412651 A1 Dec. 12, 2024

Related U.S. Application Data

(60) Provisional application No. 63/472,221, filed on Jun. 9, 2023.

(51) Int. Cl.
*G09B 5/02* (2006.01)
*G06F 1/16* (2006.01)

(52) U.S. Cl.
CPC ............ *G09B 5/02* (2013.01); *G06F 1/1632* (2013.01)

(58) Field of Classification Search
CPC ........... G09B 5/02; G09B 5/00; G06F 1/1632; G06F 1/16
See application file for complete search history.

(56) References Cited

U.S. PATENT DOCUMENTS

D270,061 S 8/1983 Ackeret
D315,549 S 3/1991 Clough et al.
D321,174 S 10/1991 Tsuchiya
D340,701 S 10/1993 Takeuchi
D352,279 S 11/1994 Foy et al.
D358,582 S 5/1995 Funaki
D361,552 S 8/1995 Iino
D363,468 S 10/1995 Mieki et al.
D392,947 S 3/1998 Iino
D398,909 S 9/1998 Yamazaki et al.
D508,693 S 8/2005 Morisawa
D557,259 S 12/2007 Hirsch
(Continued)

FOREIGN PATENT DOCUMENTS

CN 303825542 S 8/2016
CN 208864145 U 5/2019
(Continued)

OTHER PUBLICATIONS

International Search Report and Written Opinion received for PCT Patent Application No. PCT/US24/32856, mailed on Sep. 20, 2024, 11 pages.
(Continued)

*Primary Examiner* — Timothy A Musselman
(74) *Attorney, Agent, or Firm* — Workman Nydegger

(57) ABSTRACT

Disclosed are embodiments of a cooking system for introducing greater precision in the cooking process. The system comprises an electronic display device, one or more kitchen utensils, and a stand, wherein the electronic display device and the one or more kitchen utensils may be disposed on or within the stand. The electronic display device may cover the one or more kitchen utensils and an upper portion of the stand so as to maintain the compactness of the system.

20 Claims, 5 Drawing Sheets

(56) References Cited

U.S. PATENT DOCUMENTS

| | | | | |
|---|---|---|---|---|
| 7,551,432 | B1 * | 6/2009 | Bockheim | F16M 11/2014 361/679.07 |
| D608,228 | S | 1/2010 | Miyawaki | |
| D609,686 | S | 2/2010 | Robinson et al. | |
| D611,500 | S | 3/2010 | Byle et al. | |
| D619,996 | S | 7/2010 | Demskie et al. | |
| D625,287 | S | 10/2010 | Rayn | |
| D638,423 | S | 5/2011 | Anderson et al. | |
| D648,727 | S | 11/2011 | Van et al. | |
| D662,932 | S | 7/2012 | Park et al. | |
| 8,317,138 | B1 | 11/2012 | Johnson, Jr. | |
| D682,200 | S | 5/2013 | Rautiainen | |
| D689,058 | S | 9/2013 | Waterman | |
| D692,435 | S | 10/2013 | Bremenkamp | |
| D715,292 | S | 10/2014 | Ahn | |
| D722,984 | S | 2/2015 | Borah | |
| D763,346 | S | 8/2016 | Jenkins | |
| D771,180 | S | 11/2016 | Jenkins | |
| D774,031 | S | 12/2016 | Otani | |
| D775,125 | S | 12/2016 | Yoshihara | |
| D784,270 | S | 4/2017 | Bhattacharya | |
| D798,378 | S | 9/2017 | Kim | |
| D811,472 | S | 2/2018 | Chen | |
| D813,863 | S | 3/2018 | Barea | |
| D816,665 | S | 5/2018 | Cheng | |
| D844,607 | S | 4/2019 | Fredette et al. | |
| D871,500 | S | 12/2019 | Balar | |
| D894,844 | S | 9/2020 | Boynton et al. | |
| D909,469 | S | 2/2021 | Watanabe et al. | |
| D929,398 | S | 8/2021 | Lin | |
| D929,399 | S | 8/2021 | Huang | |
| 11,112,832 | B2 | 9/2021 | Kwitek | |
| D947,123 | S | 3/2022 | Dong et al. | |
| D951,254 | S | 5/2022 | Chen | |
| D953,322 | S | 5/2022 | Moore et al. | |
| D973,019 | S | 12/2022 | Wang et al. | |
| 11,581,914 | B1 * | 2/2023 | Sosan | H04B 1/3877 |
| D984,372 | S | 4/2023 | Li et al. | |
| D1,018,657 | S | 3/2024 | Dong et al. | |
| D1,024,987 | S | 4/2024 | Deng | |
| D1,051,901 | S | 11/2024 | Wang et al. | |
| D1,057,814 | S | 1/2025 | Wu et al. | |
| D1,065,317 | S | 3/2025 | Luo et al. | |
| D1,069,894 | S | 4/2025 | Cai et al. | |
| D1,123,924 | S | 4/2026 | Roney et al. | |
| D1,125,152 | S | 5/2026 | Roney et al. | |
| 2003/0072133 | A1 | 4/2003 | Chuang | |
| 2013/0066390 | A1 | 3/2013 | Schwibner et al. | |
| 2013/0250117 | A1 | 9/2013 | Pixley et al. | |
| 2014/0098485 | A1 | 4/2014 | Vahid | |
| 2015/0188356 | A1 | 7/2015 | Chen et al. | |
| 2016/0064987 | A1 | 3/2016 | Sheu et al. | |
| 2016/0070405 | A1 | 3/2016 | Wada et al. | |
| 2016/0335037 | A1 | 11/2016 | Baranowski et al. | |
| 2017/0004806 | A1 | 1/2017 | Edwards | |
| 2018/0013116 | A1 * | 1/2018 | Dorr | B65D 73/0014 |
| 2018/0084932 | A1 | 3/2018 | Khademhosseini | |
| 2019/0125113 | A1 * | 5/2019 | Chung | G01G 19/4146 |
| 2019/0202369 | A1 | 7/2019 | Nemitz | |
| 2021/0059401 | A1 * | 3/2021 | Perelli | A47B 97/04 |
| 2022/0049992 | A1 | 2/2022 | Nivala et al. | |

FOREIGN PATENT DOCUMENTS

| | | |
|---|---|---|
| GB | 6331907 | 10/2024 |
| GB | 6331908 | 10/2024 |
| JP | 2005-173743 A | 6/2005 |
| KR | 30-1285527 | 12/2024 |
| WO | D223962-000 | 10/2022 |

OTHER PUBLICATIONS

"HEIGAOLA Mini PC" Jun. 6, 2024, Amazon, site visited Jul. 24, 2025: https://www.amazon.com/HEIGAOLA-Screen-Computer-Display-Desktop/dp/BOD4YWFXCX (Year: 2024).

"Pipo X2S Mini PC 8inch" Dec. 24, 2021, Amazon, site visited Jul. 24, 2025: https://www.amazon.com/-/es/pulgadas-pantalla-Windows-Tablet-escritorio/dp/B09P5G2L2N (Year: 2021).

"Amazon Fire HD 10 Tablet" Nov. 5, 2019, Amazon, site visited Jul. 24, 2025: https://www.amazon.com/fire-hd-10/dp/B07K1RZWMC (Year: 2019).

"Belkin Belkin Kitchen Stand and Wand / Stylus for Tablets" Aug. 3, 2011, Amazon, site visited Jul. 24, 2025: https://www.amazon.com/Belkin-Kitchen-Stand-Stylus-Tablets/dp/B005NHTG6O (Year: 2011).

"Linkedin 2004 Project: Digital kitchen assistant" Jan. 6, 2020, Linkedin, site visited Jul. 24, 2025: https://www.linkedin.com/pulse/2004-project-digital-kitchen-assistant-francisco-yantorno (Year: 2020).

"Phone Areana Google Pixel Tablet" Mar. 8, 2024, phoneareana, site visited Jul. 24, 2025: https://www.phonearena.com/google-pixel-tablet-release-date-price-features-and-news (Year: 2024).

"The kitchn 8 iPad and Tablet Stands Made for Cooking in the Kitchen" Jun. 6, 2019, the kitchn, site visited Jul. 24, 2025: https://www.thekitchn.com/8-ipad-and-tablet-stands-made-for-cooking-in-the-kitchen-212533 (Year: 2019).

Meet the Julia, your do-it-all countertop chef, Jan. 6, 2020, [retrieved Apr. 4, 2025], Retrieved from Internet, URL: <https://www.cnet.com/home/kitchen-and-household/meet-julia-your-do-it-all-cooking-assistant/> (Year: 2020).

Non-Final Office Action received for U.S. Appl. No. 17/110,076, mailed on Apr. 10, 2025, 9 pages.

Non-Final Office Action received for U.S. Appl. No. 29/894,503, mailed on Jul. 28, 2025, 7 pages.

Non-Final Office Action received for U.S. Appl. No. 29/894,504, mailed on Jul. 28, 2025, 7 pages.

Notice of Allowance received for U.S. Appl. No. 29/894,506, mailed on Aug. 1, 2025, 8 pages.

Notice of Allowance received for U.S. Appl. No. 29/894,506, mailed on Sep. 23, 2025, 3 pages.

Office Action received for Japanese Patent Application No. 2023-019417, mailed on Jan. 18, 2024, 2 pages.

Office Action received for Korean Patent Application No. 30-2023-0039686 , mailed on Jul. 1, 2024, 2 pages.

Office Action received for Korean Patent Application No. 30-2023-0039689, mailed on Jul. 1, 2024, 2 pages.

Office Action received for Mexican Patent Application No. MX/F/2023/002873, mailed on Apr. 12, 2024, 7 pages.

EX Parte Quayle Action received for US. Appl. No. 30/030,055, mailed on Dec. 3, 2025, 11 pages.

Ex Parte Quayle Action received for U.S. Appl. No. 29/894,506, mailed on Dec. 18, 2025, 8 pages.

Notice of Allowance received for U.S. Appl. No. 29/894,503, mailed on Jan. 13, 2026, 4 pages.

Notice of Allowance received for U.S. Appl. No. 29/894,504, mailed on Jan. 13, 2026, 4 pages.

Notice of Allowance received for U.S. Appl. No. 29/894,503, mailed on Dec. 23, 2025, 5 pages.

Notice of Allowance received for U.S. Appl. No. 29/894,504, mailed on Dec. 23, 2025, 5 pages.

Notice of Allowance received for U.S. Appl. No. 29/894,506, mailed on Jun. 29, 2026, 8 pages.

Notice of Allowance received for U.S. Appl. No. 30/030,055, mailed on Jun. 29, 2026, 8 pages.

* cited by examiner

INTEGRATED KITCHEN SYSTEM

CROSS-REFERENCE TO RELATED APPLICATIONS

This application claims the benefit of and priority to U.S. Provisional Patent Application Ser. No. 63/472,221 filed on Jun. 9, 2023, and entitled "INTEGRATED KITCHEN SYSTEM," which application is expressly incorporated herein by reference in its entirety.

BACKGROUND

Many individuals find the process of cooking to be a frustrating experience. Small changes or deviations from a recipe can lead to wildly different results. For example, a dish baked at the wrong temperature or for the wrong amount of time may be practically inedible. Sometimes a cook may desire to intentionally alter the amount of ingredients in a recipe while maintaining the original ratio between each of the ingredients. At other times a cook may have inadvertently changed a recipe (e.g., including too much of an ingredient in a mixture) before the cooking process is completed and desires to adjust the recipe to correct the mistake. While the adjustment may be possible, it may require additional time from the cook (often in short supply during the short time schedules of the cooking process), and an error in making the adjustment has the potential to ruin the dish.

Other cooks wish they had more precision and control in their cooking. Precision kitchen utensils are available, but a serious cook may quickly find their counter cluttered with kitchen utensils, tools, and recipe books, the complexity of which may overwhelm or intimidate the inexperienced cook. Substantial mistakes in the cooking process may easily occur in these situations.

Accordingly, there is a need for cooking systems that facilitate precision cooking, that reduce the clutter present on the countertop, or that simplifies modification of a recipe. Such a cooking system may prevent a user from wasting ingredients and reduce the frustration of the cooking process.

BRIEF SUMMARY

Disclosed herein are embodiments of a kitchen system, comprising an electronic display device, one or more kitchen utensils, and a stand, wherein the electronic display device and the one or more kitchen utensils may be disposed on or within the stand, and wherein the electronic display device covers the one or more kitchen utensils when both the electronic display device and the one or more kitchen utensils are disposed on or within the stand.

The electronic display device may display a recipe and/or instructions for following a recipe. The kitchen utensils may comprise electric, digital, and/or wireless utensils. The utensils may transmit and/or receive information to and from the electronic display device and which may then be used to modify a display of the electronic display device.

The stand may be connected to an independent power source and the electric, digital, and/or wireless utensils and the electronic display device may include an internal power source. The stand may be configured to provide a charging source, including a wireless charging source, for charging the utensils and/or electronic display device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments that are illustrated in the appended drawings. Understanding that these drawings depict only typical embodiments and are not therefore to be considered to be limiting in scope, embodiments will be described and explained with additional specificity and detail through the use of the accompanying drawings described below.

DETAILED DESCRIPTION

Disclosed embodiments may provide kitchen systems with integrated components for increasing the precision and ease of the cooking process. Users may receive feedback from the system as a result of information collected by system components which may be useful in more precisely following or altering a recipe. The compact configuration and presentation of recipes and/or collected information by the disclosed embodiments may further aid the user in maintaining organized kitchen surfaces and facilitate routines of the cooking process.

Additionally, disclosed embodiments provide an integrated system for charging, storing, and pairing kitchen utensils with an electronic display device. For example, a stand may be configured to create electrical connections with the one or more kitchen utensils and the electronic display device. The electrical connections may charge the individual kitchen utensils and the electronic display device. Additionally, the electronic connections may provide data communications to the individual kitchen utensils. For instance, the one or more kitchen utensils may be configured to communicate to the electronic display device through a personal area network (PAN), such as Bluetooth, Zigbee, Wi-Fi Direct, Infrared, and/or any other conventional wireless communication protocol. In at least one embodiment, however, the kitchen utensils may not be configured to communicate through a local area network (LAN) and/or to the internet. As such, in at least one embodiment, the stand is configured to provide software updates to the kitchen utensils through a PAN network connection and/or through physical electronic connections. For instance, the stand itself may be configured to communicate to the internet and/or the electronic display device may be configured to communicate to the internet and then to the kitchen utensils.

Figure 1:
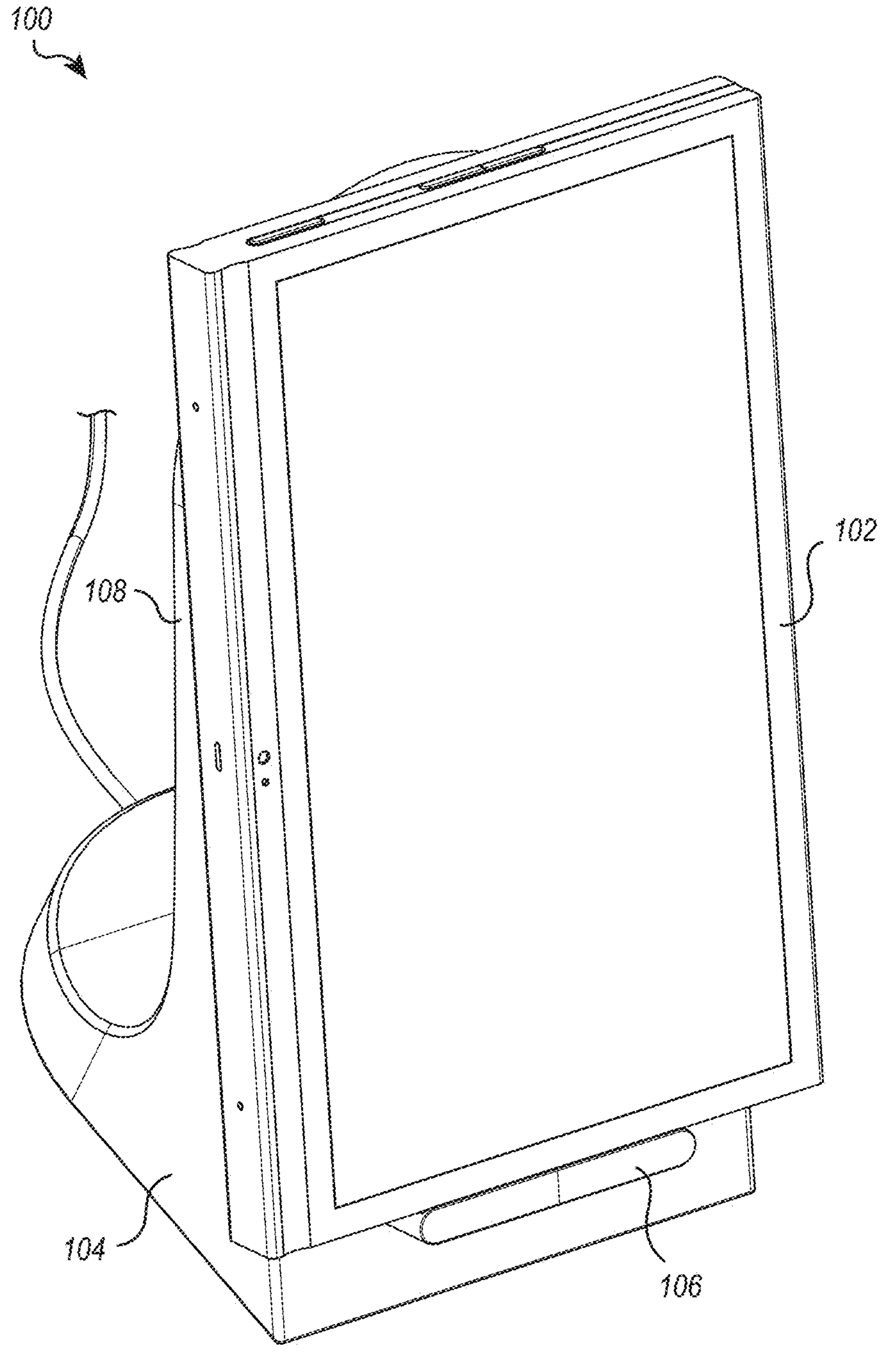
FIG. 1 illustrates an exemplary kitchen system.

FIG. 1 illustrates an exemplary kitchen system 100 comprising an electronic display device 102 and a stand 104. The stand 104 may be configured to support both the electronic display device 102 and one or more kitchen utensils 110, 112 (shown in FIG. 2). In at least one embodiment, the electronic display device 102 is supported on a surface of the stand 104, and one or more kitchen utensils are disposed within the stand 104. This configuration allows the electronic display device 102, kitchen utensils, and the stand 104 to remain relatively compact, conserving space on a countertop or other cooking surface of a kitchen.

The electronic display device 102 may comprise a touch screen display that allows a user to interact with various applications and programs stored in the device 102 or accessible via a network connection. The electronic display device 102 may also comprise one or more speakers, microphones, cameras, sensors, buttons, ports, or other components that provide additional functionality and user interface options. For example, the electronic display device 102 may use a microphone and a speaker to enable voice-based commands and responses, such as speech recognition and text-to-speech. The electronic display device 102 may also use a camera and a sensor to enable gesture-based commands and responses, such as detecting hand movements or facial expressions. The electronic display device 102 may also use a port to connect to an external device, such as a keyboard, mouse, or printer.

The electronic display device 102 may comprise a tablet computer, or other electronic device capable of displaying or otherwise communicating information to a user, including in a visual and/or aural manner. The electronic display device 102 may be configured to display (or otherwise convey) a recipe and/or instructions for following a recipe. For example, the electronic display device 102 may display a list of ingredients, the amount of ingredients to be used, steps for combining ingredients, or other instructions for cooking the ingredients of a recipe.

Additionally, the electronic display device 102 may be configured to communicate with one or more external devices or services via a network connection. For example, the electronic display device 102 may access a database of recipes stored on a remote server or use an online search engine to find recipes based on user preferences or available ingredients. The electronic display device 102 may also connect to a social media platform or a messaging service to allow the user to share their cooking experience, photos, videos, or feedback with other users. The electronic display device 102 may also receive recommendations, tips, ratings, or comments from other users regarding the recipe or the cooking process. Moreover, the electronic display device 102 may provide interactive features, such as video tutorials, live streaming, voice assistance, or augmented reality, to enhance the user's engagement and learning.

Figure 2:
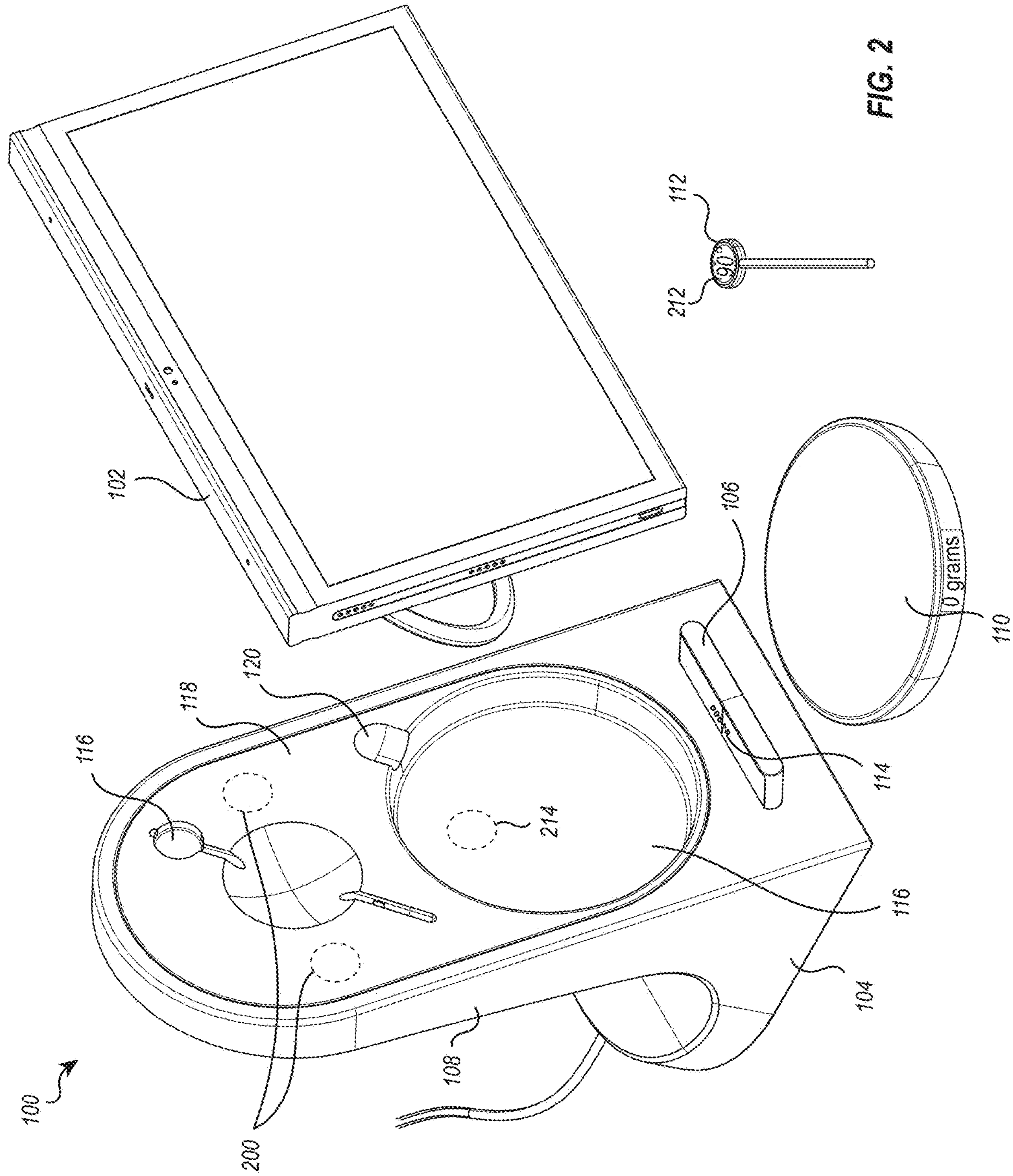
FIG. 2 illustrates an exemplary cooking system, wherein the electronic display device and kitchen utensils are removed from the stand.

FIG. 2 illustrates the kitchen system 100 where the electronic display device 102 and the one or more kitchen utensils have been removed from the stand 104. The system 100 may include any number of kitchen utensils. In FIG. 2 the system 100 includes a scale 110 and a thermometer 112. However, the kitchen utensils may comprise other utensils, including a measuring cup, a measuring spoon, a can opener, an oil sprayer, a heat vacuum sealer, a lighter, a spice and/or herb grinder, a vegetable or food chopper, a whisk, a hand blender, or other kitchen utensil.

The kitchen utensils may comprise electric and/or digital utensils, such as a digital scale, a measuring cup with an embedded digital scale, a measuring spoon with a digital scale or anti-shake mechanism, a digital or infrared thermometer (e.g., a digital meat thermometer), an electric can opener, an electric lighter, an electric hand blender, or other electric and/or digital utensil. The electric and/or digital utensil may produce information (e.g., measurement information) used in the cooking process. This information may then be transmitted to the electronic display device 102. The information may be used to modify a display of the electronic display device 102. The display of the electronic display device 102 may be further modified by input from the user (e.g., input of baking elevation may modify the baking time required by the recipe).

For example, temperature measurements obtained from a kitchen utensil comprising a digital thermometer may be used to produce an alarm, an alert, or other indication that a step in the cooking process (e.g., baking, grilling, frying, sautéing, etc.) is completed. The temperature measurements may also be used to begin a timer once a temperature measurement above a certain value has been obtained, or to modify the value displayed on a timer, or modify the expected time of completion based on the transmitted temperature measurements.

In another example, a weight or mass measurement of an ingredient is obtained by a digital utensil, such as a digital scale, a digital measuring cup, or a digital measuring spoon. The weight or mass measurement may then be transmitted to the electronic display device 102 and used to modify the display of the electronic display device 102 (e.g., removing an ingredient from a list of ingredients, instructing a user to include more or less of an ingredient, or modify a cooking time or baking temperature of the recipe). The digital utensil may also provide a volumetric measurement of an ingredient by first obtaining a weight or mass measurement and converting the measurement to a volumetric value via an approximate density value of the ingredient. The density value of the ingredient may be provided by the user or selected from a list of options corresponding to density values. For example, using the digital utensil or electronic display device 102, the user may select a density value from a list of density values stored in a memory of the digital utensil or electronic display device 102 corresponding to the approximate density of common ingredients (e.g., water, milk, oil, flour, sugar, et cetera).

In yet another example, the electric and/or digital utensil may comprise an electric hand blender. The mixing speed of the electric hand blender may be adjusted manually by a user and information comprising the mixing speed may then be transmitted and displayed on the electronic display device 102. Information may also be transmitted from the electronic display device 102 to the electric and/or digital utensil. For example, a user may adjust the mixing speed of an electric hand blender of the system 100 by providing an input to the electronic display device 102. The electric hand blender may also be configured to measure the viscosity of a mixture. The viscosity measurement obtained by the electric hand blender may be transmitted to the electronic display device 102 and which may then indicate via the display whether continued blending of the mixture is required or whether additional ingredients should be included (e.g., to provide additional amounts of water to lower the viscosity of the mixture). The stand 104 comprises a front surface 118 defining a first plane. The first plane may be positioned and configured to support the electronic display device 102. The front surface 118 may further comprise one or more recesses 116, the recesses extending at least partially into the first plane. Additionally, the recesses may comprise depths and shapes such that when a kitchen utensil is inserted into a recess the utensil does not extend past the first plane. Each recess 116 may form a tight fit against at least a portion of the kitchen utensil. As used herein, a "tight fit" refers to the recess being formed to receive a specific kitchen utensil and securely hold the specific kitchen utensil such that the kitchen utensil is firmly held in a particular orientation. The recess 116 may also comprise a finger notch 120 for removing the kitchen utensil. For example, the recess 116 for the thermometer 112 may comprise a concave hemisphere positioned around a portion of the stem the thermometer 112. This concave hemisphere may allow a user to easily grab the stem of the thermometer 112 and remove the thermometer 112 from the stand. In contrast, the remaining portions of the recess 116 may be shaped to provide a tight fit to the distal ends of the thermometer 112.

The one or more kitchen utensils may be secured to the stand 104 via a clip (e.g., tension clip, spring clip, terry clip, retaining clip, etc.), clamp, bracket, or other fastener that is embedded in or otherwise attached to the stand 104. The one or more kitchen utensils may also be secured to the stand 104 by a magnet embedded or attached to the stand 104. For example, a kitchen utensil, such as scale 110, may comprise a round shape such that it has no natural orientation with respect to a round recess 116. Nevertheless, the recess may comprise one or more embedded magnets 214 that mate to corresponding one or more magnets on the scale 110. This may cause the scale 110 to always maintain a particular orientation when it is placed within the recess 116. This may be of particular use when the kitchen utensil comprises a display 210, a charging portion, or some other feature that benefits from maintaining a particular orientation.

Alternatively, the recesses may comprise one or more drawers, shelves, slots, or compartments for storing the kitchen utensils. The drawers, shelves, slots, or compartments may be located below or behind the electronic display device 102, such that the kitchen utensils are hidden from view when not in use. The drawers, shelves, slots, or compartments may also be configured to communicate with the electronic display device 102 via wired or wireless connections, such that the electronic display device 102 can detect which kitchen utensils are stored within the stand 104 and display relevant information accordingly. For example, the electronic display device 102 may provide a list of available kitchen utensils within the stand 104, or suggest recipes that can be prepared using the stored kitchen utensils.

For the sake of simplicity, the figures only depict a scale 110 and a thermometer 112 within the system 100. Nevertheless, the system 100 can be modified to include any number of different kitchen utensils. For example, a recess 116 can be created to have a tight fit for a measuring cup or some other utensil. Additionally or alternatively, the system 100 is also able to operate with kitchen utensils that are too large to store within the stand. For example, a counter-top mixer may be larger than the entire system 100. In such a case, the system 100 is able to communicate with the counter-top mixer through the same means it uses to communicate with the other kitchen utensils.

In at least one embodiment, the electronic display device 102 comprises a height and width sufficient to cover the one or more kitchen utensils disposed on or within the stand 104. Further, the electronic display device 103 may have a height and width sufficient to cover an entire front surface of the upper portion 108 of the stand 104 (wherein the upper portion 108 of the stand 104 may comprise the portion of the stand 104 disposed above the lip 106). In at least one embodiment, by covering the one or more kitchen utensils 110, 112 with the electronic display device 102, the system 100 is able to keep loose ingredients and other debris from contaminating the one or more kitchen utensils 110, 112. For example, the electronic display device 102 may comprise an easily cleanable glass display surface. As ingredients are spilled before or during the cooking process, the electronic display device 102 may shield the one or more kitchen utensils 110, 112 from getting dirty. Additionally, the glass surface of the electronic display device 102 may be easily wiped clean to remove any debris that lands on its surface.

In at least one embodiment the electronic display device 102 comprises the only display of the system 100, such that any recipes, instructions for following a recipe, measurement information, or data displayed as a result of information transmitted from the one or more kitchen utensils to the electronic display device 102 is displayed solely by the electronic display device. In other embodiments, the one or more kitchen utensils may display or otherwise convey to the user information relevant to the cooking process, such as through a led display or other visual indicator. For example, the scale 110 is shown in a mass display 210 and the thermometer 112 is shown with a temperature display 212.

For example, a digital mass measurement utensil, such as a digital scale, a digital measuring cup, or other utensil may display a weight or mass measurement obtained by the utensil. Alternatively or additionally, the digital mass measurement utensil may include a colored light or a display having a backlight, wherein a first color is displayed by the colored light or backlight when the weight or mass of an ingredient of a recipe disposed on the utensil is higher than a minimum value, and wherein a second color is displayed by the colored light or backlight when a difference between the weight or mass of the ingredient of a recipe disposed on the utensil and an amount of the ingredient required by a recipe is less than a minimum value.

One or more kitchen utensils may also convey information to the user aurally or in a tactile manner. For example, an electric hand blender may provide an audio alert or other sound or generate a vibration produced by an embedded vibration mechanism to alert or indicate to the user to terminate a blending step in the cooking process.

Some of the electric and/or digital utensils may be capable of receiving commands or instructions from the electronic display device 102. For example, a digital oven thermometer may receive a target temperature or a timer setting from the electronic display device 102. Additionally or alternatively, the electronic display device 102 may automatically adjust the settings of one or more electric and/or digital utensils based on the information obtained from other utensils or from the recipe. For example, the electronic display device 102 may lower the heat of an electric stove or oven when the temperature of the food reaches a certain level, or turn off a mixer when the batter reaches a desired consistency. The electronic display device 102 may also provide feedback to the user about the status of the cooking process, such as indicating when the food is done or needs attention.

Thus, the kitchen system 100 may provide information relevant to the cooking process by transmitting information between the utensils and electronic display device 102. The information may represent real-time information of the cooking environment or may include automatic calculations that aid in following or modifying a recipe. This information may reduce the mental demand placed on the user (and consequently diminish the frustration experienced by the user and the potential for error in the cooking process) and aid in establishing greater precision in the cooking process.

The electric and/or digital utensils may comprise wireless utensils. The wireless utensils can include an independent power supply and be capable of sending and/or receiving the wireless transmission of information to and/or from the electronic display device 102. The independent power supply may comprise an internal power source, such as a replaceable or rechargeable internal battery. The stand 104 may be connected to an external power source, such as a power outlet. The stand 104 may provide power to the electric and/or digital utensils, such as through a power cord or electrical power connector.

The stand 104 may be configured to transmit power through a physical electrical connection or through a wireless electrical connection to the wireless utensils and/or electronic display device 102. As used herein, a "physical electrical connection" comprises a physical connection between two electrically conductive materials. The methods of wireless power transmission may include capacitive coupling, inductive coupling, radiofrequency (RF) wireless charging, or other wireless power transmission method.

In at least one embodiment, the physical mating component (e.g., the lip 106) comprises an electrical connector in the form of a magnetic pin connector 114 for charging the electronic display device 102 disposed on the stand 104. Alternatively, the stand 104, one or more kitchen utensils, and/or electronic display device 102 may include one or more induction coils. Each induction coil of the stand 104 may comprise a sender coil and each induction coil of the one or more kitchen utensils and/or electronic display device 102 may comprise a receiver coil. The stand 104 may include only one induction coil and include the capacity for charging an internal battery in each of the wireless utensils and/or electronic display device 102, such that a fluctuating magnetic field produced by the sender coil of the stand 104 induces an electric current in each receiver coil of the wireless utensils and/or electronic display device 102. Alternatively, the stand 104 may include a separate induction coil for each wireless utensil and/or electronic display device 102 of the system 100 for inducing an electric current within each wireless utensil and/or electronic display device 102.

In at least one embodiment, the electronic display device comprises a tablet computer that is wholly removable from the stand 104. The stand 104 may comprise a physical mating component for holding and/or supporting the electronic display device 102. For example, the physical mating component may comprise a lip 106 for supporting the electronic display device 102. Additionally or alternatively, the physical mating component may comprise one or more magnets 200 embedded within a front surface 118 of the stand 104. Corresponding magnets 300 (shown in FIG. 3) may also be embedded within the electronic display device 102. One or more magnets may be positioned to both physically secure the electronic display device 102 to stand 104 and also to maintain a desired alignment between the electronic display device 102 and stand 104. For example, the one or more magnets may be positioned such that that electronic display device 102 is held in a position that maintains a physical electrical connection with a charging source within the stand 104.

Figure 3:
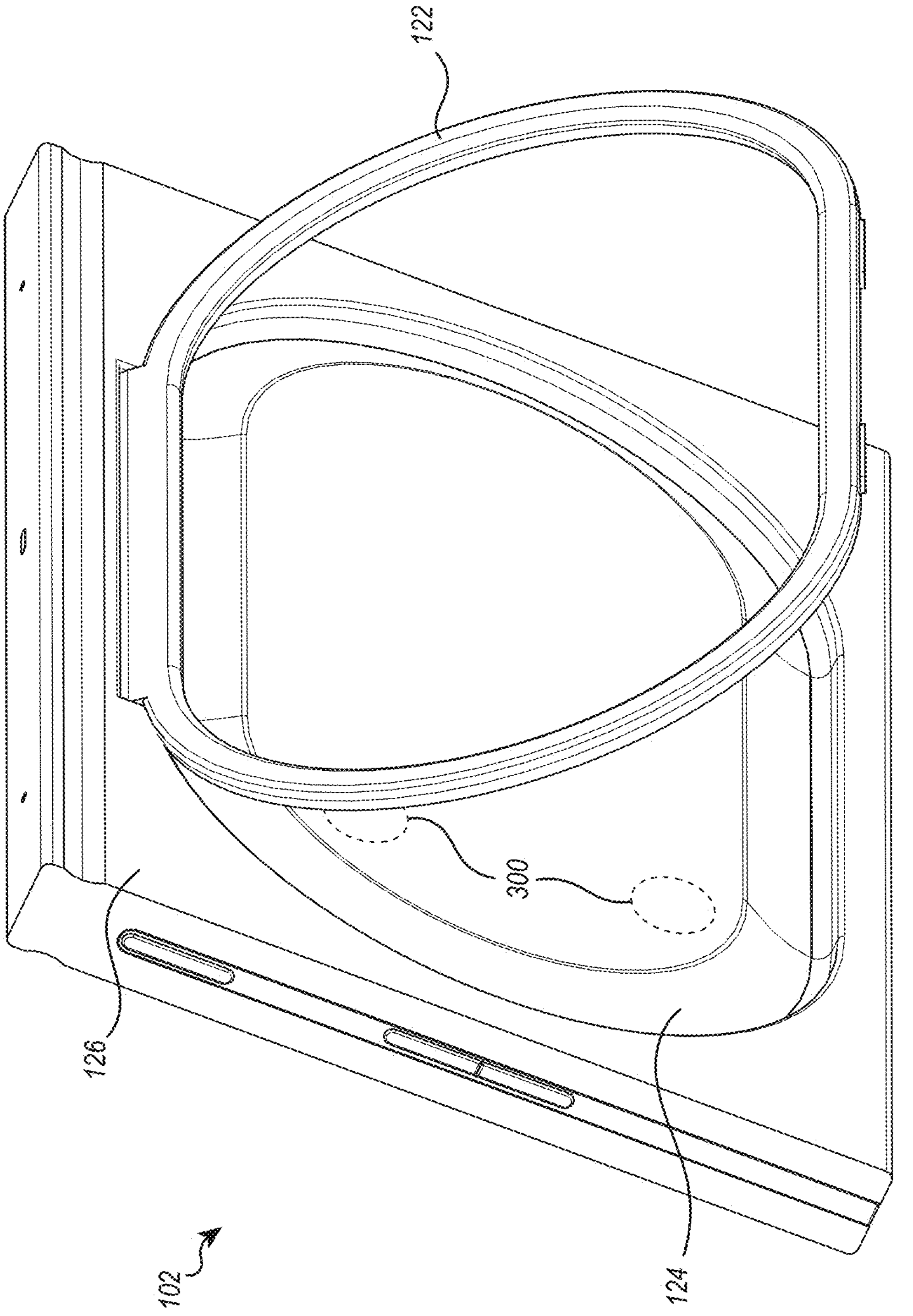
FIG. 3 illustrates a rear view of the electronic display device.

FIG. 3 illustrates an embodiment of the electronic display device 102, which may maintain a generally upright position independent of the stand 104. For example, the electronic display device 102 may include a kickstand 122 such that the electronic display device 102 may assume a generally upright orientation (including either a horizontal or vertical orientation) when not disposed upon the stand 104. The kickstand 122 may be hingeably connected to the electronic display device 102 and swung into a kickstand recess 124 located on a back surface 126 of the electronic display device 102, such that the kickstand 122 does not protrude from the back surface 126 of the electronic display device 102 when not in use. Alternatively, the kickstand 122 may be detached and stowed when not in use.

In an additional or alternative embodiment, the electronic display device 102 is affixed to the stand 104. In this manner, the electronic display device 102 may remain connected to the stand 104 while in use, thus helping to prevent the countertop or other kitchen surfaces from becoming cluttered. The electronic display device 102 may be hingeably, pivotably, or slidably affixed to the stand 104.

Figure 4:
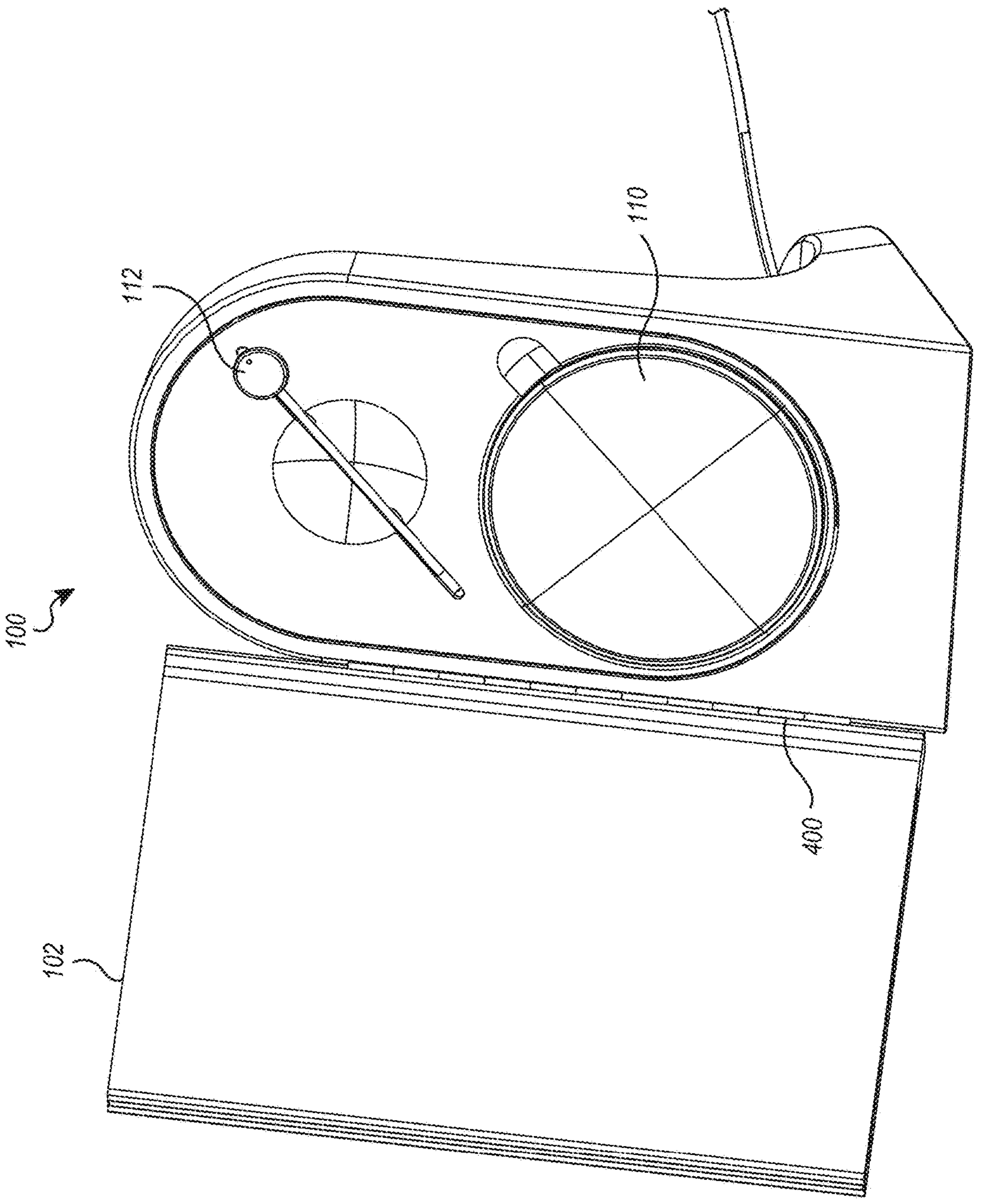
FIG. 4 illustrates a front view of an embodiment of the electronic display device.

For example, FIG. 4 depicts an embodiment where the electronic display device 102 is connected to the stand 104 via a hinge 400. In various embodiments, the hinge 400 may be disposed on or towards a lateral portion, upper portion, or lower portion of the stand 104, such that a display of the electronic display device 102 faces towards a user when the electronic display device 102 is positioned to cover at least a portion of the front surface 118 of the upper portion 108 of the stand 104. As such, the electronic display device 102 may swing to the side (in the case of a laterally disposed hinge), upwardly (in the case of an upper-disposed hinge), or downwardly (in the case of a lower-disposed hinge) to reveal the front surface of the stand 104 and the one or more kitchen utensils 110, 112 disposed therein.

Figure 5:
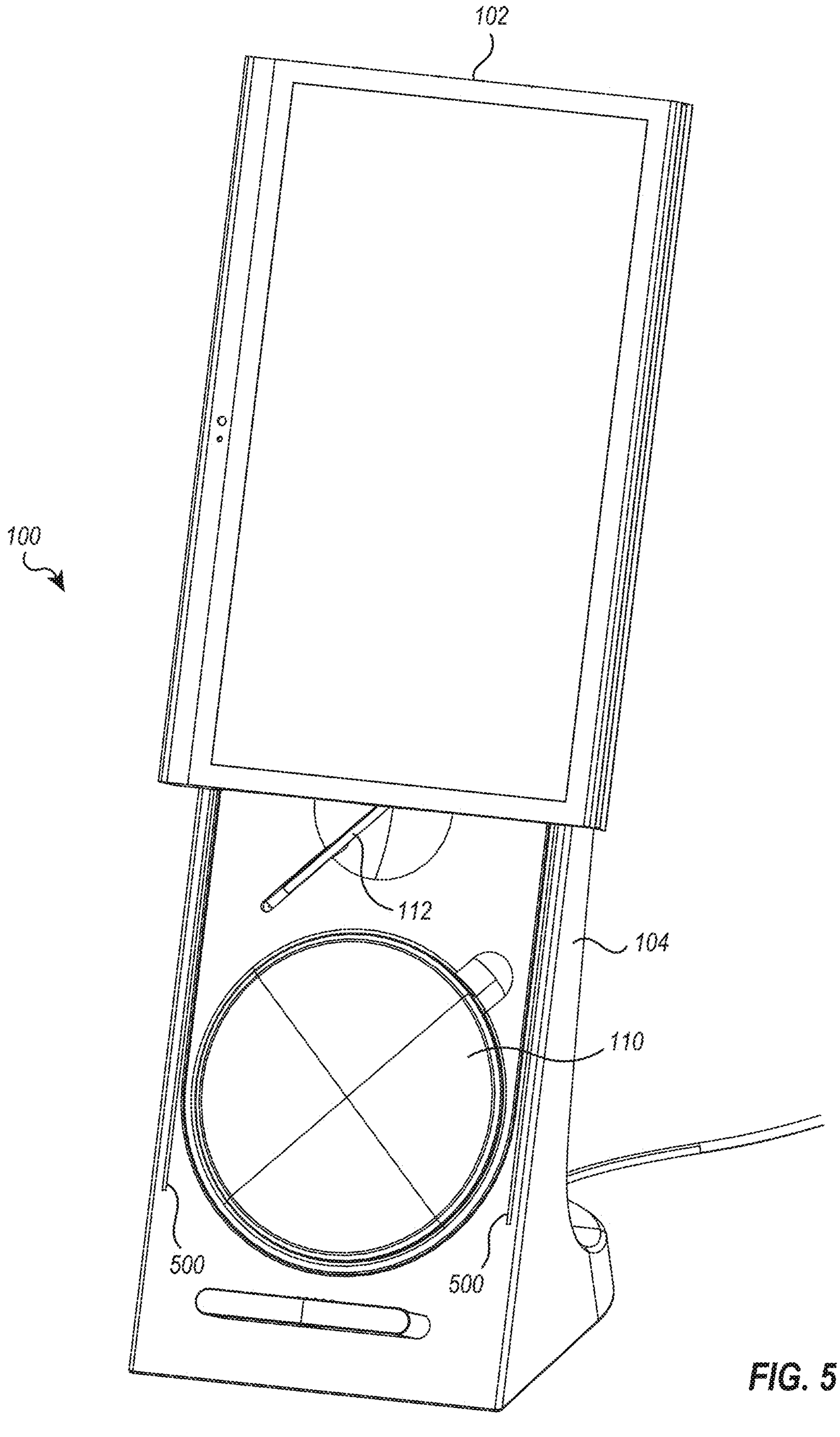
FIG. 5 illustrates a front view of another embodiment of the electronic display device.

Alternatively, FIG. 5 depicts the electronic display device 102 affixed to the stand 104 via a sliding mechanism 500. In this embodiment, that the electronic display device 102 may slide from a position wherein the device 102 covers the front surface of the upper portion 108 of the stand 104 to a position lateral, above, or below at least a portion of the front surface 116 of the upper portion 108 of the stand 104. A physical mating component, such as the lip 106 may allow the electronic display device 102 to rest in a neutral state.

Additionally, in at least one embodiment the electronic display device 102 may also be pivotally affixed to the stand 104 at a pivot point, through a pivoting mechanism such as a ball and socket joint, such that the electronic display device 102 may rotate about the pivot point from a position covering the front surface the upper portion 108 of the stand 104 and the kitchen utensils to a position above, below, or lateral to a portion of the front surface of the upper portion 108 of the stand 104 so as to reveal a front surface of the stand 104 and the kitchen utensils.

When physically connected to the stand 104 as described above, the electronic display device 102 may communicate to the stand 104 through a wired connection that travels through the physical mating components (e.g., the hinge, the slide, the pivot point, etc.). The stand 104 and/or the electronic display device 102 may then communicate to the kitchen utensils wirelessly.

Disclosed embodiments in a system 100 that is an integrated kitchen system that comprises an electronic display device 102, a stand 104, and a plurality of kitchen utensils 110. The system 100 allows a user to interact with the electronic display device 102 while cooking or preparing food using the kitchen utensils 110. The electronic display device 102 may provide various functions, such as displaying recipes, videos, images, texts, or other information related to cooking or food preparation. The electronic display device 102 may also receive inputs from the user, such as voice commands, touch inputs, gestures, or other types of inputs.

The stand 104 can be configured to support the electronic display device 102 and the kitchen utensils 110 in a convenient and accessible manner. The stand 104 may have a base portion, an upper portion 108, and a lip 106. The base portion may be adapted to be placed on a flat surface, such as a countertop, a table, or a cutting board. The upper portion 108 may extend from the base portion and may have a front surface 116 that is configured to hold the kitchen utensils 110. The lip 106 may protrude from the upper portion 108 and may be configured to prevent the electronic display device 102 from sliding off the stand 104.

The kitchen utensils 110 may include any type of utensil that may be used for cooking or preparing food, such as knives, spoons, forks, spatulas, whisks, peelers, graters, measuring cups, measuring spoons, or other types of utensils. The kitchen utensils 110 may be equipped with sensors, actuators, or other components that enable them to communicate with the electronic display device 102 and/or the stand 104. The communication may be wireless or wired, and may allow the kitchen utensils 110 to transmit or receive data, such as temperature, weight, pressure, motion, time, or other types of data. The electronic display device 102 and/or the stand 104 may use the data to provide feedback, guidance, instructions, alerts, or other types of information to the user.

The system 100 provides various benefits to the user, such as enhancing the user's cooking or food preparation experience, improving the user's skills, increasing the user's efficiency, reducing the user's errors, or providing the user with entertainment or enjoyment. The system 100 may also improve the user's safety, hygiene, or health by preventing or detecting potential hazards, such as burns, cuts, spills, contamination, or allergic reactions. The system 100 may also facilitate the user's cleaning, storing, or organizing of the kitchen utensils 110 and the electronic display device 102.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The present invention is further specified in the following aspects.

In a first aspect, an integrated kitchen system comprises an electronic display device; one or more kitchen utensils; a stand; and wherein: the stand comprises a physical mating component that is configured to mate with the electronic display device, when mated to the stand, the electronic display device is configured to cover at least a portion of a particular surface of the stand, the one or more kitchen utensils are configured to be disposed within the particular surface of the stand, and the electronic display device is configured to cover the one or more kitchen utensils when the electronic display device is mated to the stand.

In a second aspect as further described in any preceding aspects, the electronic display device comprises a tablet computer.

In a third aspect as further described in any preceding aspects, the particular surface of the stand further comprises one or more recesses for receiving the one or more kitchen utensils.

In a fourth aspect as further described in any preceding aspects, the one or more kitchen utensils do not protrude from a front surface of the stand when fully inserted into the one or more recesses.

In a fifth aspect as further described in any preceding aspects, at least one of the one or more recesses is formed to match an outline of at least one of the one or more kitchen utensils.

In a sixth aspect as further described in any preceding aspects, at least one of the one or more recesses further comprises a finger notch for removing the one or more kitchen utensils from the at least one of the one or more recesses.

In a seventh aspect as further described in any preceding aspects, the stand further comprises a clip, or other fastener, for securing the one or more kitchen utensils to the stand.

In an eighth aspect as further described in any preceding aspects, the physical mating component comprises a hinge, pivot, or slide for mating the electronic display device to the stand.

In a ninth aspect as further described in any preceding aspects, the physical mating component comprises a lip for supporting the electronic display device.

In a tenth aspect as further described in any preceding aspects, the electronic display device displays a recipe and/or instructions for following a recipe.

In an eleventh aspect as further described in any preceding aspects, the one or more kitchen utensils comprise one or more of a scale, a thermometer, a measuring cup, a measuring spoon, a can opener, an oil sprayer, a heat vacuum sealer, a lighter, a spice and/or herb grinder, a vegetable or food chopper, a whisk, and a hand blender.

In a twelfth aspect as further described in any preceding aspects, the one or more kitchen utensils comprise an electric utensil.

In a thirteenth aspect as further described in any preceding aspects, the electric utensil comprises a wireless utensil.

In a fourteenth aspect as further described in any preceding aspects, the stand further comprises a charging source.

In a fifteenth aspect as further described in any preceding aspects, the charging source of the stand comprises an induction coil for charging the electronic display device.

In a sixteenth aspect as further described in any preceding aspects, the charging source is configured charge the electric utensil.

In a seventeenth aspect as further described in any preceding aspects, the charging source is configured to charge the electric utensil through a physical electric connection.

In an eighteenth aspect as further described in any preceding aspects, the electronic display device is configured to communicate wirelessly with the electric utensil.

In a nineteenth aspect as further described in any preceding aspects, the electronic display device is configured to display the information transmitted from the electric utensil.

In a twentieth aspect as further described in any preceding aspects, the information transmitted to the electronic display device is measurement information obtained by the electric utensil.

The invention claimed is:

1. An integrated kitchen system, comprising:
an electronic display device;
one or more kitchen utensils; and
a stand;
wherein:
the stand comprises a physical mating component that is configured to mate with the electronic display device, when mated to the stand, the electronic display device is configured to cover at least a portion of a particular surface of the stand, the particular surface of the stand comprises one or more recessed cavities formed within the stand and dimensioned to receive respective ones of the one or more kitchen utensils such that the one or more kitchen utensils are received below the particular surface of the stand, the one or more kitchen utensils are configured to be disposed within the one or more recesses within the particular surface of the stand, and the electronic display device is configured to cover the one or more kitchen utensils when the electronic display device is mated to the stand such that the one or more kitchen utensils are covered and concealed from view and physically retained within the recessed cavities by the electronic display device.

2. The integrated kitchen system of claim 1, wherein the electronic display device comprises a tablet computer.

3. The integrated kitchen system of claim 1, wherein each of the one or more recesses is shaped to conform to an outline of a corresponding kitchen utensil and is configured to limit lateral movement of the kitchen utensil within the recess.

4. The integrated kitchen system of claim 3, wherein the one or more kitchen utensils do not protrude from a front surface of the stand when fully inserted into the one or more recesses, whereby the electronic display device rests directly over the front surface of the stand without interference from the one or more kitchen utensils.

5. The integrated kitchen system of claim 3, wherein at least one of the one or more recesses is formed to match an outline of at least one of the one or more kitchen utensils.

6. The integrated kitchen system of claim 3, wherein at least one of the one or more recesses further comprises a finger notch for removing the one or more kitchen utensils from the at least one of the one or more recesses, the finger notch being positioned to remain accessible only when the electronic display device is not mated to the stand.

7. The integrated kitchen system of claim 1, wherein the stand further comprises a clip, or other fastener, for securing the one or more kitchen utensils to the stand.

8. The integrated kitchen system of claim 1, wherein the physical mating component comprises a hinge, pivot, or slide for mating the electronic display device to the stand, wherein the hinge, pivot, or slide is configured to allow the electronic display device to move between (i) an open position exposing the recessed cavities and (ii) a closed position in which the electronic display device covers and retains the one or more kitchen utensils within the recessed cavities.

9. The integrated kitchen system of claim 1, wherein the physical mating component comprises a lip for supporting the electronic display device.

10. The integrated kitchen system of claim 1, wherein the electronic display device is configured to displays a recipe and/or instructions for following a recipe.

11. The integrated kitchen system of claim 1, wherein the one or more kitchen utensils comprise one or more of a scale, a thermometer, a measuring cup, a measuring spoon, a can opener, an oil sprayer, a heat vacuum sealer, a lighter, a spice and/or herb grinder, a vegetable or food chopper, a whisk, and a hand blender.

12. The integrated kitchen system of claim 11, wherein the one or more kitchen utensils comprise an electric utensil.

13. The integrated kitchen system of claim 12, wherein the electric utensil comprises a wireless utensil.

14. The integrated kitchen system of claim 13, wherein the stand further comprises a charging source.

15. The integrated kitchen system of claim 14, wherein the charging source of the stand comprises an induction coil for charging the electronic display device.

16. The integrated kitchen system of claim 14, wherein the charging source is configured to charge the electric utensil.

17. The integrated kitchen system of claim 16, wherein the charging source is configured to charge the electric utensil through a physical electric connection.

18. The integrated kitchen system of claim 12, wherein the electronic display device is configured to communicate wirelessly with the electric utensil.

19. The integrated kitchen system of claim 18, wherein the electronic display device is configured to display information transmitted from the electric utensil.

20. The integrated kitchen system of claim 18, wherein information transmitted to the electronic display device is measurement information obtained by the electric utensil.

* * * * *